United States Patent
Shimazawa et al.

(10) Patent No.: US 10,043,542 B2
(45) Date of Patent: Aug. 7, 2018

(54) PLASMON GENERATOR WITH SEPARATING LAYER FOR THERMAL ASSISTED MAGNETIC RECORDING HEAD

(71) Applicant: TDK Corporation, Tokyo (JP)

(72) Inventors: Koji Shimazawa, Tokyo (JP); Tsutomu Chou, Tokyo (JP); Yoshihiro Tsuchiya, Tokyo (JP); Kosuke Tanaka, Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 15/080,964

(22) Filed: Mar. 25, 2016

(65) Prior Publication Data
US 2017/0278530 A1    Sep. 28, 2017

(51) Int. Cl.
   *G11B 5/127*    (2006.01)
   *G11B 5/48*    (2006.01)
   *G11B 5/00*    (2006.01)
   *G11B 5/012*    (2006.01)

(52) U.S. Cl.
   CPC ............ *G11B 5/4866* (2013.01); *G11B 5/127* (2013.01); *G11B 5/012* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 7,529,158 B2 | 5/2009 | Matsumoto et al. | |
| 8,305,849 B2 | 11/2012 | Hara et al. | |
| 8,964,514 B2 | 2/2015 | Hirata et al. | |
| 2015/0131417 A1* | 5/2015 | Zhao | G11B 5/6082 369/13.33 |

FOREIGN PATENT DOCUMENTS

| | | |
|---|---|---|
| JP | 2006-190446 A | 7/2006 |
| JP | 2008-159192 A | 7/2008 |

OTHER PUBLICATIONS

Hu, C.K. et al., "Electromigration reliability study of submicron Cu Interconnections" Conference Proceedings ULSI XV, 2000, pp. 691-697. Published by Materials Research Society.

* cited by examiner

*Primary Examiner* — Brian Butcher
(74) *Attorney, Agent, or Firm* — Posz Law Group, PLC

(57) ABSTRACT

A plasmon generator generates surface plasmon and generates near-field light from the surface plasmon at a distal end surface situated on an air bearing surface facing a magnetic recording medium. The plasmon generator has a first portion including the distal end surface, a second portion situated away from the air bearing surface, and a separating layer situated between the first portion and the second portion and separating the first portion from the second portion.

17 Claims, 11 Drawing Sheets

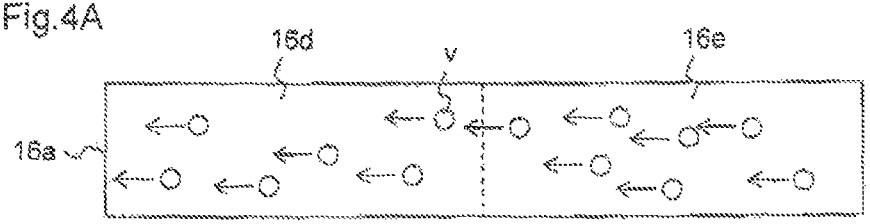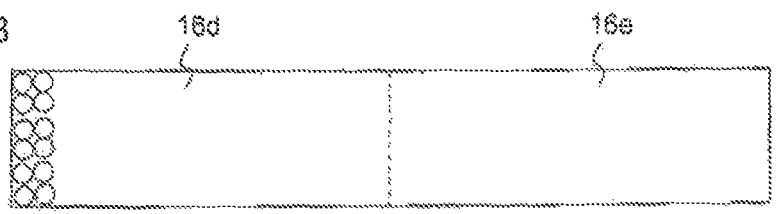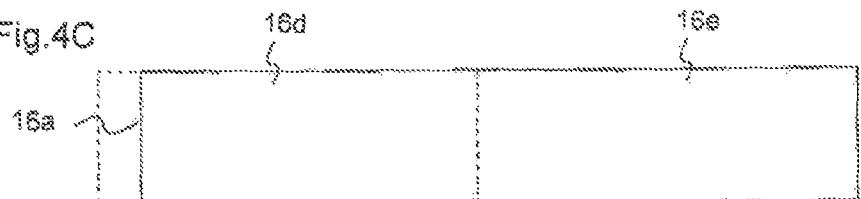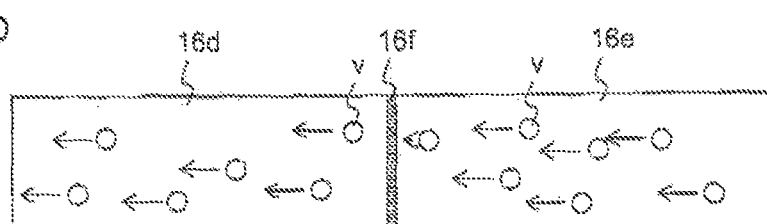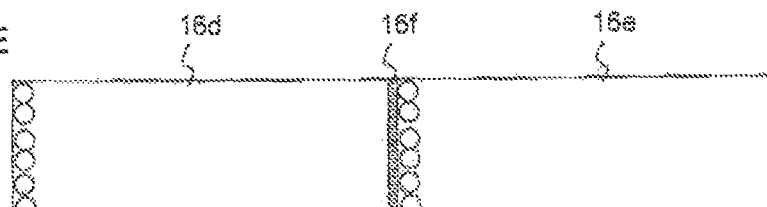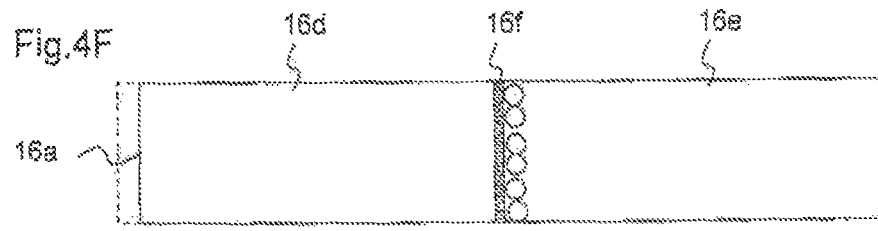

PLASMON GENERATOR WITH SEPARATING LAYER FOR THERMAL ASSISTED MAGNETIC RECORDING HEAD

BACKGROUND OF THE INVENTION

1. Field of the Invention

The present invention relates to a thermal assisted magnetic recording head, and particularly to a configuration of a plasmon generator provided with the thermal assisted magnetic recording head.

2. Description of the Related Art

In recent years, in magnetic recording devices included in magnetic disc devices, there has been a need for improvement in performance of the thin-film magnetic head and magnetic recording media in association with higher recording densities. Thin-film magnetic heads are extensively used in which a composite-type thin-film magnetic head in which a reproducing head having a magneto-resistance effect element for reading, and a recording head having an induction-type electromagnetic transducer element for writing, are layered on a substrate.

A magnetic recording medium is a discontinuous medium in which magnetic grains are aggregated, and each magnetic grains has a single magnetic domain structure. Each recording bit on the magnetic recording medium is configured by a plurality of magnetic grains. In order to increase the recording density, the borderlines between adjacent recording bits must have smaller asperity. Therefore, the magnetic grains must be smaller. On the other hand, smaller magnetic grains, namely magnetic grains have smaller volumes, exhibit lower thermal stability of magnetization. As one solution to solve this problem, it is effective to increase the anisotropic energy of magnetic grains. However, high anisotropic energy of magnetic grains increases the magnetic coercive force of a magnetic recording medium and makes it difficult to record information with an existing magnetic head.

As a method of solving the above problem, a so-called thermal assisted magnetic recording has been proposed. This method allows for use of high coercive force magnetic recording media. For recording information, a magnetic field and heat are simultaneously applied to a portion of a magnetic recording medium where information is to be recorded so as to raise the temperature of the portion. On the portion where the magnetic coercive force is accordingly lowered, information is recorded by the magnetic field. The magnetic head used in thermal assisted magnetic recording is called a thermal assisted magnetic recording head (TAMR head) hereafter.

A typical TAMR includes a core propagating light emitted from a laser diode and a plasmon generator generating near-field light. The plasmon generator is coupled to some of the propagation light propagated through the core in the surface plasmon mode to generate surface plasmon, propagates the surface plasmon to a distal end surface situated on the air bearing surface, and generates near-field light at the distal end surface.

In the current TAMR, deterioration in recording properties (S/N ratio and the like) associated with continuous recording results. As a main factor, agglomeration at the distal end surface of the plasmon generator occurs. Agglomeration is a phenomenon of metal atoms gathering, which results from diffusion and migration of metal atoms due to heat and stress as a driving force. The air bearing surface of a magnetic head slider and the surface of a magnetic recording medium have asperities, and the distal end surface of the plasmon generator sometimes makes contact with the magnetic recording medium while the magnetic recording device is in operation. Raised temperature and increased stress due to this contact in such a situation causes the agglomeration. The agglomeration is likely to cause the distal end surface of the plasmon generator to recede (recess) from the air bearing surface. Consequently, the distance between the plasmon generator and the magnetic recording medium is increased, and the ability to heat the magnetic recording medium deteriorates with time, causing deterioration in the S/N ratio and the like. Therefore, it is desirable to prevent the agglomeration in the plasmon generator to ensure reliability of the TAMR head.

JP2006-190446 discloses an electromagnetic field conversion element in which a metal film made of multiple materials converts light entering from the transparent substrate side to surface plasmon polariton. JP2008-159192 discloses a plasmon antenna made of two different materials. Using such techniques, it is possible to create a plasmon generator with a distal end surface made of a material that is unlikely to undergo agglomeration. However, as the distal end surface of a plasmon generator is required to also generate converged near-field light, and it is difficult to achieve both.

The present invention aims to provide a plasmon generator for generating converged near-field light that is unlikely to undergo agglomeration at the distal end surface, and a thermal assisted magnetic recording head using the same.

SUMMARY OF THE INVENTION

An embodiment of the present invention relates to a plasmon generator generating surface plasmon and generating near-field light from the surface plasmon at a distal end surface situated on an air bearing surface facing a magnetic recording medium. The plasmon generator has a first portion including the distal end surface, a second portion situated away from the air bearing surface, and a separating layer situated between the first portion and the second portion and separating the first portion from the second portion.

In another embodiment, the plasmon generator includes a barrier layer between the distal end surface and a read end surface in a height direction that minimizes migration of atomic vacancies.

According to another embodiment of the present invention, the thermal assisted magnetic recording head has a plasmon generator generating surface plasmon and generating near-field light from the surface plasmon at a distal end surface situated on an air bearing surface facing a magnetic recording medium, and a main pole situated near the plasmon generator on the air bearing surface and releasing a magnetic flux to the magnetic recording medium. The plasmon generator has a first portion including the distal end surface, a second portion situated away from the air bearing surface, and a separating layer situated between the first portion and the second portion and separating the first portion from the second portion.

Generally, atomic vacancies resulting from missing atoms at crystal lattice points are present in metals. The atomic vacancies are prone to migrate to a high stress and high temperature environment. A set of atomic vacancies forms a void causing agglomeration. The distal surface end of a plasmon generator is under high stress and high temperature due to collision with a magnetic recording medium and convergence of near-field light, whereby atomic vacancies are prone to migrate to the distal end surface of the plasmon generator. In the plasmon generator of the present invention, the first portion having the distal end surface is separated from the second portion by a separating layer. Therefore, the atomic vacancies present in the second portion are blocked by the separating layer to minimize migration to the first portion. The atomic vacancies present in the first portion are not inhibited from migrating to the distal end surface by the separating layer. However, the number of atomic vacancies migrating to the distal end surface is reduced, and thus a void, or agglomeration due to the void, is unlikely to occur at the distal end surface.

The above and other objectives, characteristics, advantage of the present invention will be apparent from the following explanation with reference to the attached drawings exemplifying the present invention.

BRIEF DESCRIPTION OF THE DRAWINGS

FIGS. 4A to 4F are schematic illustrations showing migration of atomic vacancies in plasmon generators;

DETAILED DESCRIPTION OF THE INVENTION

Figure 1:
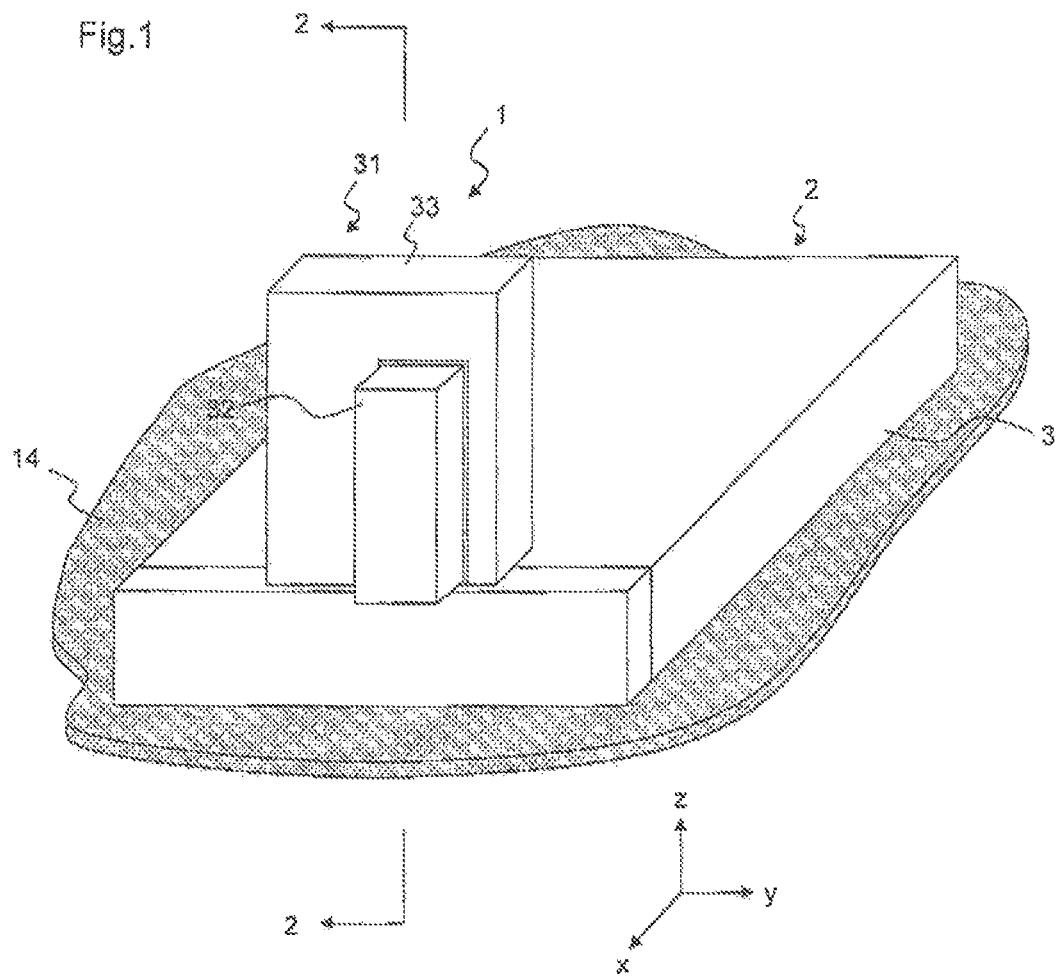
FIG. 1 is an overall perspective view of a thermal assisted magnetic recording head.
Figure 2:
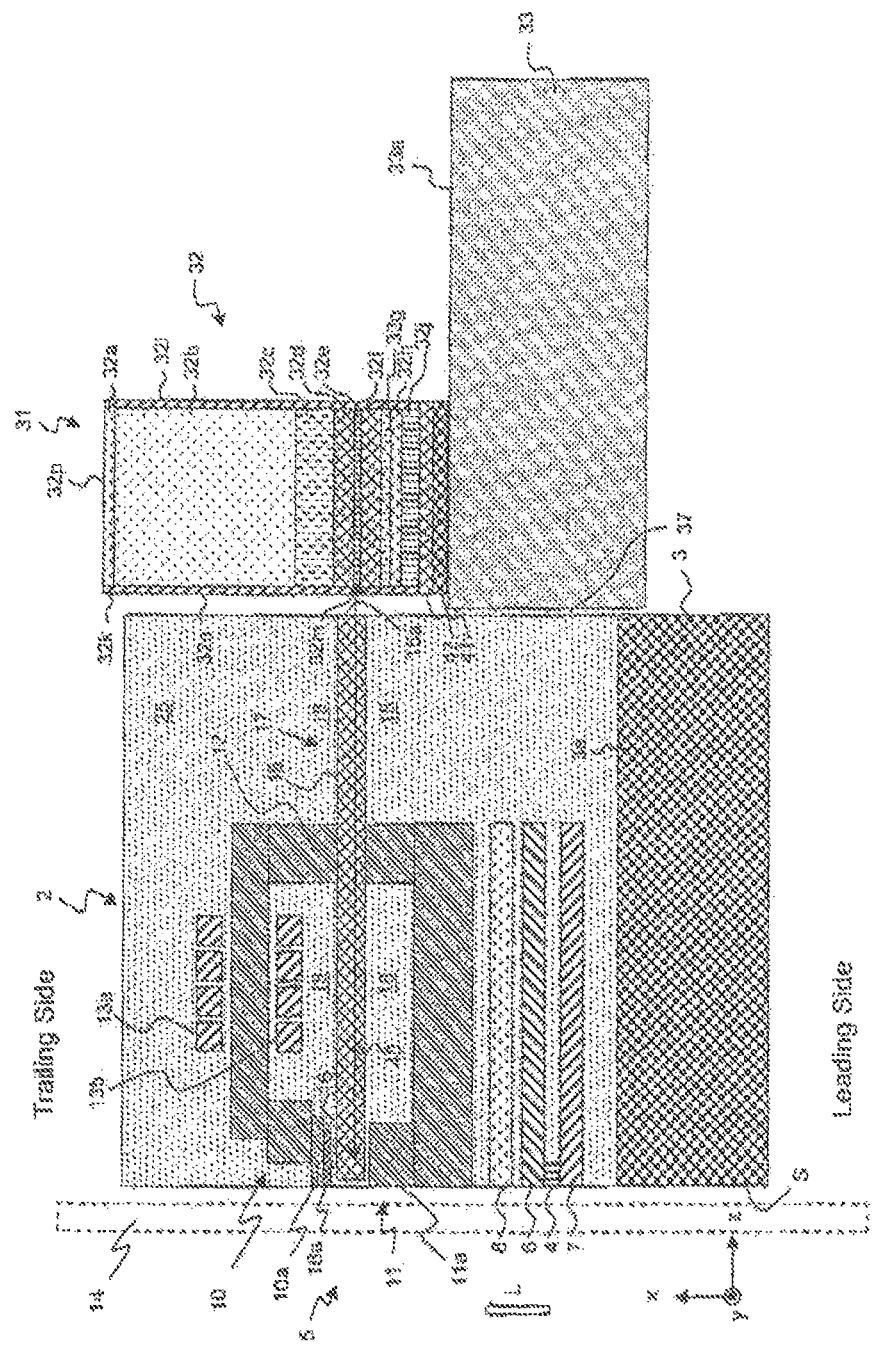
FIG. 2 is a conceptual cross-sectional view of the thermal assisted magnetic recording head according to an embodiment of the present invention.

First, the configuration of the thermal assisted magnetic recording head according to an embodiment of the present invention will be described. FIG. 1 is an overall perspective view of a thermal assisted magnetic recording head. FIG. 2 is an overall cross-sectional view of the thermal assisted magnetic recording head along the line 2-2 in FIG. 1.

In this specification, the x direction means the down track direction, or the direction orthogonal to an integration surface 3a of a substrate 3 on which an MR (magneto resistive) element, magnetic recording element, and the like are formed, and corresponds to the circumferential direction of the magnetic recording medium. The y direction means the cross track direction of a magnetic recording medium 14 and corresponds to the radial direction of a magnetic recording medium. The z direction means the direction orthogonal to the air bearing surface S of a magnetic head slider. The x direction is equal to the film-forming direction L in a wafer process. The x, y and z directions are orthogonal to each other. The terms "upper" and "lower" refer to the direction away from the substrate and the direction toward the substrate, respectively, in regard to the x direction. The term "upper" may be substituted by the term "trailing side" and the term "lower" may be substituted by the term "leading side."

A magnetic head 1 has a magnetic head slider 2 and a laser diode unit 31 fixed to the magnetic head slider 2 and emitting laser light.

The magnetic head slider 2 has a nearly hexahedral shape, of which one surface configures an air bearing surface S facing a magnetic recording medium 14. The magnetic head slider 2 has an MR element 4, a magnetic recording element 5, a waveguide 17 provided with a core 15 capable of propagating laser light emitted from the laser diode unit 31 as propagation light, and a plasmon generator 16 generating near-field light on the air bearing surface S from the propagation light. These elements are formed on the substrate 3 made of AlTiC ($Al_2O_3$—TiC).

The magnetic recording element 5 has a main pole 10 for vertical magnetic recording that faces the air bearing surface S. The main pole 10 is provided next to the plasmon generator 16. A part of the main pole 10 protrudes on the leading side and is in contact with the plasmon generator 16. In this way, heat generated by the plasmon generator 16 can be released to the main pole 10. A main pole end surface 10a that is an end surface of the main pole 10 is situated on the air bearing surface S and generates a recording magnetic field on the air bearing surface S. A leading shield 11 is provided on the leading side of the main pole 10 in the down track direction x. The leading shield 11 is magnetically coupled to the main pole 10 via a contact part 12 to configure an integrated magnetic circuit together with the main pole 10. The leading shield 11 has a shield end surface 11a facing the air bearing surface S. Coils 13a and 13b are wound around the main pole 10, and the contact part 12 is the center. The main pole 10, the leading shield 11, and the contact part 12 are made of an alloy consisting of any two or three of Ni, Fe, and Co or the like. An overcoat layer 25 made of $Al_2O_3$ is provided above the magnetic recording element 5 in the x direction.

A magnetic flux generated in the main pole 10 is released from the main pole end surface 10a to the magnetic recording medium 14 as a writing magnetic flux. The magnetic flux released from the main pole end surface 10a enters into the magnetic recording medium 14 and magnetizes the recording bits in the vertical direction z. The magnetic flux changes its magnetic path to the in-plane direction of the magnetic recording medium 14 (the x direction), further turns to the vertical direction (the z direction) again near the leading shield 11, and is absorbed by the leading shield 11 from the shield end surface 11a.

The magnetic head slider 2 has the waveguide 17 capable of propagating laser light. The waveguide 17 is situated closer to the leading side in the down track direction x than the plasmon generator 16. The waveguide 17 has the core 15 extending in the z direction and a clad 18 covering the core 15. The core 15 propagates laser light generated in the laser diode unit 31 in the z direction as propagation light 40. The core 15 extends from an end part 15a (the laser light incident end surface) of the magnetic head slider 2 that faces the laser diode unit 31 to the vicinity of the air bearing surface S. The cross section of the core 15 is rectangular, which is orthogonal to the propagation direction of the propagated light 40 (the z direction), and the width (dimension in the y direction) is larger than the thickness (dimension in the x direction). The core 15 can be made of, for example, TaOx. Here, TaOx means tantalum oxide of any composition, and is typically, but not limited to, $Ta_2O_5$, TaO, $TaO_2$, and the like. The core 15 is covered with the clad 18 having a lower refractive index than the core 15. The clad 18 can be made of, for example, a dielectric substance such as $SiO_2$ and $Al_2O_3$.

The magnetic head slider 2 includes the MR element 4 of which the distal end part is situated on the air bearing surface S, and an upper part shield layer 6 and lower part shield layer 7 provided on either side of the MR element 4 in the x direction. The MR element 4 is a reproducing element reading information recorded on a magnetic recording medium and can be any of a current in plane (CIP)-gigantic magneto resistive (GMR) element in which the sense current flows in the y direction, a current perpendicular to plane (CPP)-GMR element in which the sense current flows in the x direction, and a tunneling magneto resistive (TMR) element in which the sense current flows in the x direction and that uses the tunnel effect. When the MR element 4 is a CPP-GMR element or TMR element, the upper part shield layer 6 and lower part shield layer 7 are also used as electrodes supplying the sense current. A magnetic shield layer 8 is provided between the MR element 4 and the magnetic recording element 5.

Figure 3A:
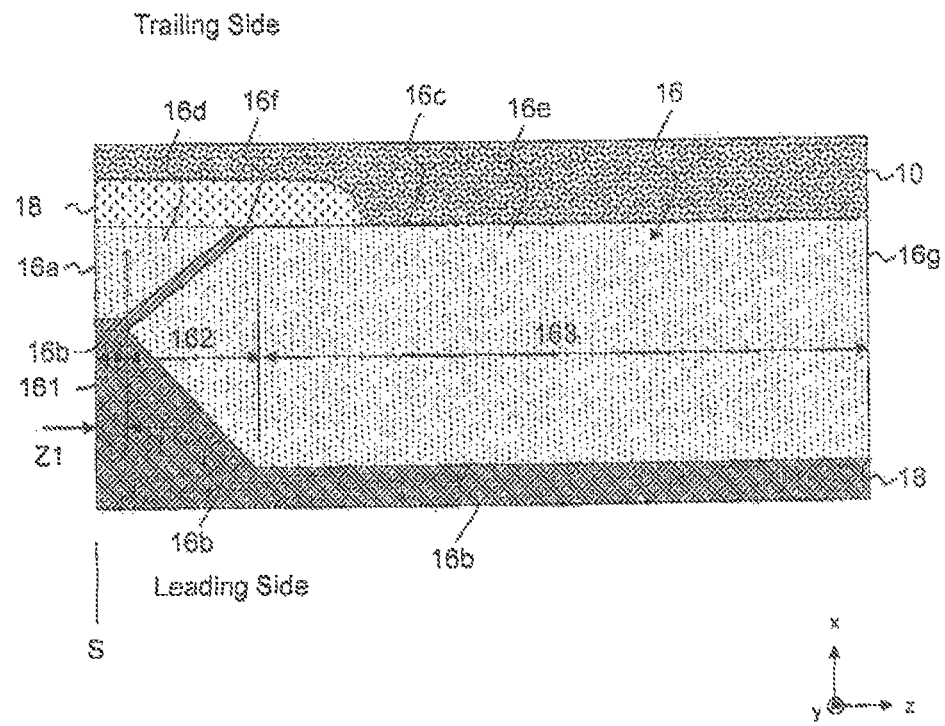
FIG. 3A is a conceptual cross-sectional view of a plasmon generator.
Figure 3B:
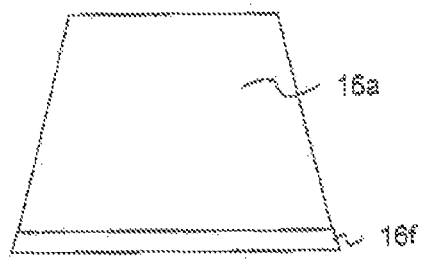
FIG. 3B is a front view of the air bearing surface of the plasmon generator shown in FIG. 3A.
Figure 3C:
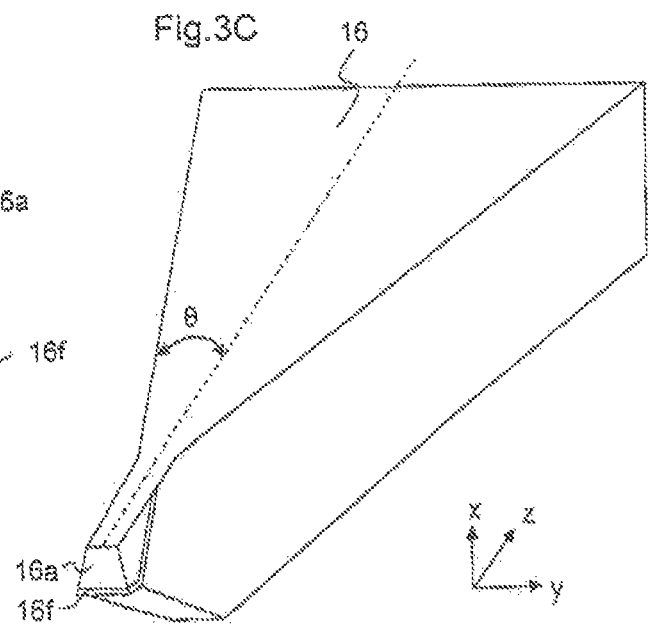
FIG. 3C is a perspective view of the plasmon generator shown in FIG. 3A.

The magnetic head slider 2 has the plasmon generator 16 generating near-field light on the air bearing surface S from the propagation light 40. As shown in FIG. 3, the plasmon generator 16 is a columnar metal piece extending in the height direction z. The plasmon generator 16 has a distal end portion 161 narrowed both in the down track direction x and in the cross track direction y, a main portion 163 having a larger dimension in the down track direction than the distal end portion 161 and gradually increased in dimension in the cross track direction y along the height direction z, and a transition portion 162 situated between the distal end portion 161 and the main portion 163. The plasmon generator 16 has a trailing side surface 16c extending in parallel to the height direction z and a leading side surface 16b in the form of a step.

The plasmon generator 16 includes a distal end surface 16a facing the air bearing surface S. The distal end surface 16a has a trapezoidal shape of which the long side is on the leading side and the short side is on the trailing side. However, the distal end surface 16a may have a rectangular, square, triangular, or other shape. The main pole end surface 10a of the main pole is situated near the distal end surface 16a.

The surface on the leading side out of the surfaces of the plasmon generator 16 extending in the height direction z is a propagation surface 16b facing the core 15. The propagation surface 16b of the main portion 163 is coupled to the propagation light 40 propagated through the core 15 in the surface plasmon mode to generate surface plasmon. The surface plasmon is propagated through the propagation surface 16b to the distal end surface 16a and generates near-field light at the distal end surface 16a. As a result, the plasmon generator 16 heats the portion of the magnetic recording medium 14 where information is recorded.

The plasmon generator 16 has a first portion 16d having the distal end surface 16a, a second portion 16e situated away from the air bearing surface S, and a separating layer 16f situated between the first and second portions 16d and 16e and separating the first portion 16d from the second portion 16e. The first and second portions 16d and 16e can be formed from a metal including Au or AuCo as the main constituent. The main constituent means that the atomic fraction of Au, the atomic fraction of AuCo, or the total atomic fraction of Au and AuCo is 90% or higher. The separating layer 16f is made of a metal material that does not form a solid solution with the material configuring the first and second portions 16e and 16f, and is preferably made of iridium (Ir), cobalt (Co), or rhodium (Rh) in particular. The separating layer 16f is situated below the first portion 16d on the air bearing surface S, crosses the plasmon generator 16, and reaches the surface 16c on the trailing side.

The separating layer 16f functions as a barrier layer preventing atomic vacancies generally present in a metal from migrating (the separating layer 16f and the barrier layer 16f are used interchangeably, hereafter). The atomic vacancies intrinsically migrate to a high stress and high temperature environment and therefore are prone to migrate to the distal end surface 16a of the plasmon generator 16 in particular. The atomic vacancies having migrated to the distal end surface 16a gather and form a void, causing the distal end surface 16a to recede from the air bearing surface S. As a result, near-field light is generated at a position receding from the air bearing surface S, and there is a higher possibility that the magnetic recording medium is not sufficiently heated. Even the recession of as small as several nm greatly affects the performance of heating a magnetic recording medium.

FIGS. 4A to 4F are schematic illustrations showing migration of atomic vacancies. When the separating layer 16f is absent, the atomic vacancies v present in the plasmon generator 16 migrate toward the distal end surface 16a that is under high stress and high temperature (see FIG. 4A). Assuming that all atomic vacancies present in the first and second portions 16d and 16e of the plasmon generator 16 migrate to the distal end surface 16a (see FIG. 4B), the atomic vacancies agglomerate at the distal end surface 16a, and the distal end surface 16a of the plasmon generator 16 recedes (see FIG. 4C).

When the separating layer 16f is present, the atomic vacancies present in the plasmon generator 16 also migrate toward the distal end surface 16a that is under high stress and high temperature (see FIG. 4D). However, the atomic vacancies present in the second portion 16e cannot pass though the separating layer 16f and therefore agglomerate on the wall surface of the separating layer 16f on the second portion 16e side (see FIG. 4E). More precisely, the probability of the atomic vacancies present in the second portion 16e passing through the separating layer 16f is much lower than the probability of the same passing through a layer made of the same material as the first portion 16d or the second portion 16e and having the same thickness as the separating layer 16f. Therefore, there is a high probability that the atomic vacancies present in the second portion 16e stay in the second portion 16e. On the other hand, the atomic vacancies present in the first portion 16d do not have a barrier that impedes their migration, so they migrate toward the distal end surface 16a that is under high stress and high temperature. However, even if all atomic vacancies migrate to the distal end surface 16a, the number of atomic vacancies gathering at the distal end surface 16a is smaller than that in FIG. 4B, and agglomeration is unlikely to occur. Even if agglomeration occurs, the distal end surface 16a recedes less (see FIG. 4F), whereby the performance of heating the magnetic recording medium is not largely affected. As a result of atomic vacancies gathering near the separating layer 16f, agglomeration may occur near the separating layer 16f, which is not related to generation of near-field light, whereby the performance of heating a magnetic recording medium is not affected.

The separating layer 16f may be situated between the distal end surface 16a and the rear end surface 16g in the height direction z of the plasmon generator 16. However, as apparent from the above explanation, it is preferable that the volume of the first portion 16d divided by the separating layer 16f is as small as possible. In this embodiment, the following relationship is satisfied in which V is the volume of the first portion 16d, ρ is the density of the material configuring the first portion 16d, ρ0 is the density of the material configuring the first portion 16d when no atomic vacancies are present, and S is the area of the distal end surface 16a:

$$V \times (1-\rho/\rho0) < S \times 3 \text{ [nm]} \quad \text{(Formula 1)}$$

Here, when the first portion 16d is made of an alloy such as AuCo, ρ☐ and ρ0 are the density of the alloy. The left side presents the volume contraction of the plasmon generator 16 at the distal end surface 16a side provided that all atomic vacancies present in the first portion 16d contribute to recession of the distal end surface 16a. The right side presents the volume contraction of the plasmon generator 16 when the distal end surface 16a of the plasmon generator 16 recedes by 3 [nm]. Therefore, when the Formula 1 is satisfied, the recession of the distal end surface 16a is suppressed to less than 3 nm even if all atomic vacancies present in the first portion 16d contribute to recession of the distal end surface 16a. It is empirically known that the recession of less than 3 nm does not largely affect the performance of heating a magnetic recording medium.

Here, the volume V of the first portion 16d and the area S of the distal end surface 16a can be overserved by a transmission-type electron microscope (TEM). (1−ρ/ρ0) can be known through TEM observation in a high temperature (~800° C.) atmosphere. More specifically, when a material is observed by a IBM during heating at a high temperature, atomic vacancies are gradually discharged and a void is formed. What % of the overall volume the atomic vacancies occupied in the initial state, namely (1−ρ/ρ0), can be determined by comparing the volume of the void and the overall volume of the plasmon generator 16 when no more volume change due to formation of a void occurs. There is no guarantee that all atomic vacancies will be discharged during high temperature heating. Therefore, the density of the material during high temperature TEM observation is the highest possible value and may actually be lower. However, no volume change in a temperature environment much higher than practical temperatures means that atomic vacancies to be discharged are substantially absent, which can be interpreted as the density ρ0 in the bulk state (no atomic vacancy state) being observed. For example, when the distal end surface 16a of the plasmon generator 16 including Au as the main constituent has a width of 40 nm in the y direction, a thickness of 40 nm in the x direction, and an average depth from the air bearing surface to the barrier layer of 40 nm in the height direction z, Formula 1 is satisfied if the ratio ρ/ρ0 of the material configuring the plasmon generator 16 exceeds 92.5%. In other words, when the volume of a void formed during IBM observation in a high temperature heating atmosphere of approximately 800° C. is less than 7.5% of the whole, the range of this embodiment is satisfied.

Figure 5:
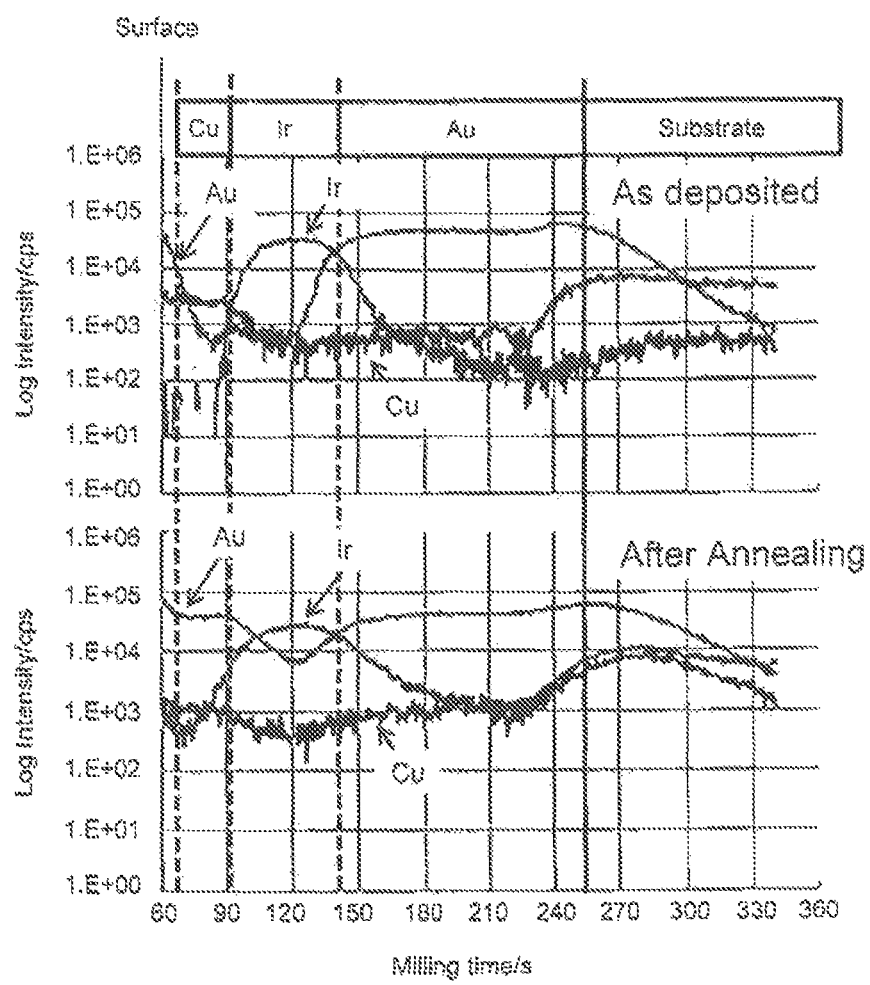
FIG. 5 is a graph showing an exemplary SIMS analysis.

It is desirable that the separating layer 16f is as thin as possible because Ir or the like configuring the separating layer 16f deteriorates the performance of light convergence. On the other hand, the separating layer 16f has to have a certain thickness to suppress passage of atomic vacancies. FIG. 5 shows the results of analyzing migration of Au atoms in a laminate of Au, Ir, and Cu by the secondary ion mass spectrometry (SIMS) method. More specifically, an Au film, Ir film, and Cu film are laminated on a substrate and the distribution (intensity) of Au and Cu atoms was measured immediately after film formation and after annealing at 450° C. The figure shows the results when the Ir film is 1 nm in thickness, and it is seen that the Au intensity in the Cu region is increased after the annealing. This suggests that as the sample was placed in a high temperature environment, the Au atoms passed through the Ir film and migrated to the Cu region. Here, a Cu film was used in order to observe Au atoms having migrated (with an Au/Ir/Au multilayer film, Au having migrated via the Ir film cannot be distinguished). Moreover, migration of Au atomic vacancies is important in the present invention. Behavior of Au atoms and atomic vacancies is similar to the relationship between electrons and holes. Then, it is possible to deduce the behavior of atomic vacancies from the behavior of Au atoms.

Table 1 shows the Au intensity in the Cu region obtained by the SIMS analysis after the annealing.

TABLE 1

| Ir film thickness (nm) | Au intensity in Cu region after |
|---|---|
| 1 | 4.60E+04 |
| 2 | 1.20E+03 |
| 5 | 1.10E+03 |
| 10 | 9.00E+02 |
| 15 | 1.00E+03 |
| average of samples upon | 1.30E+03 |

The average of samples upon film formation is considered to fall within a range of measurement error or background noise. The Au intensity is nearly equal to the average upon film formation when the Ir film has a thickness of 2 nm or larger, while Au intensity is largely increased when the film thickness is 1 nm. Then, it is preferable that the separating layer 16f has a thickness of 2 nm or larger.

Figure 6A:
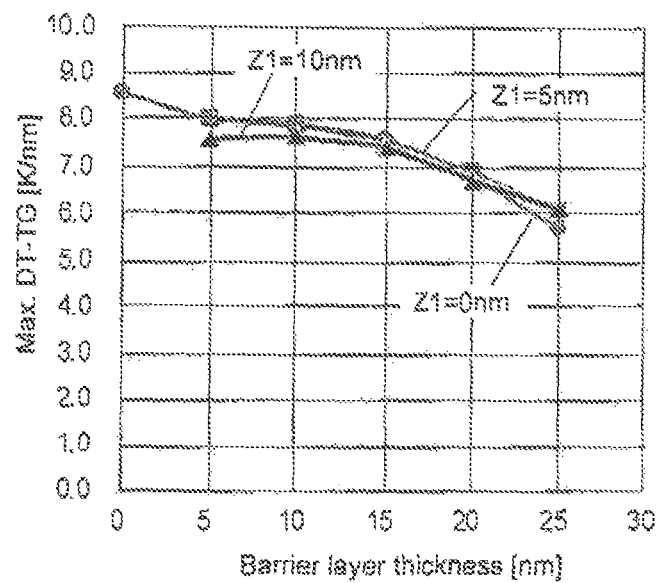
FIG. 6A is a graph showing the relationship between the thickness of the separating layer and the down track direction thermal gradient at the distal end surface of the plasmon generator.
Figure 6B:
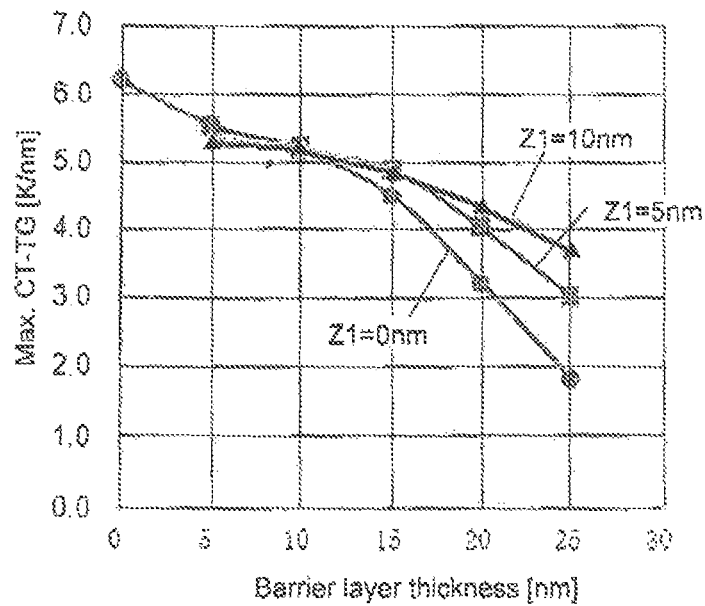
FIG. 6B is a graph showing the relationship between the thickness of the separating layer and the cross track direction thermal gradient at the distal end surface of the plasmon generator.

FIG. 6A shows the thickness of the barrier layer and the maximum value of the down track direction thermal gradient (DT-TG) at the distal end surface 16a of the plasmon generator 16. FIG. 6B shows the thickness of the barrier layer and the maximum value of the cross track direction thermal gradient (CT-TG) at the distal end surface 16a of the plasmon generator 16. A thermal assisted magnetic recording head is required to heat only bit to record. In order to realize high density recording, it is important to converge near-field light and heat on an area as small as possible of a magnetic recording medium. To do so, it is desirable that the thermal gradient at the distal end surface 16a of the plasmon generator 16 is large. The thermal gradient is the temperature change in unit length in the down track direction or in the cross track direction at the distal end surface 16a of the plasmon generator 16. FIGS. 6A and 6B show that when the barrier layer has a thickness of 15 nm or smaller, no significant reduction is observed in both the DT-TG and CT-TG compared with when the barrier layer is absent. Therefore, it is desirable that the barrier layer has a thickness of 15 nm or smaller.

In FIGS. 6A and 6B, the dimension Z1 presents the length of a surface extending from the air bearing surface S in parallel to the height direction z on the leading side of the plasmon generator 16. As Z1 is larger, the CT-TG when the barrier layer is thicker is higher. Moreover, the CT-TG most easily decreases when the barrier layer extends diagonally upward from the air bearing surface (Z1=0). Thus, it is desirable that the first portion 16d of the plasmon generator 16 has a surface 16b extending from the air bearing surface S in parallel to the height direction z on the leading side. Here, in the example shown, the total thickness in the x direction on the air bearing surface S of the Au layer and Ir layer is 60 nm, the thickness in the x direction of the second portion 16e is 95 nm, and the taper angle θ (see FIG. 3C) is 15 degrees.

With reference to FIG. 2 again, the laser diode unit 31 is situated to face the surface of the magnetic head slider 2 that is opposite to the air bearing surface S. The laser diode unit 31 emits laser light in the direction z perpendicular to the air bearing S toward the core 15 of the waveguide 17 of the magnetic head slider 2. The laser diode unit 31 is soldered to the magnetic head slider 2 by an adhesive layer 37.

The laser diode unit 31 includes a laser diode 32 that is a laser light generation element and a sub-mount 33 to mount the laser diode 32. The laser diode 32 supplies laser light to the core 15. The sub-mount 33 consists of a Si substrate or the like. The laser diode 32 is mounted on a mounting surface 33a of the sub-mount 33. More specifically, a first electrode (p electrode) 32j of the laser diode 32 is fixed to a pad 41 provided on the mounting surface 33a of the sub-mount 33 with a solder material 42.

The laser diode 32 is an end surface-emitting type and can be InP, GaAs, or GaN-based or the like as generally used for communication, optical disc storage, or material analysis. The wavelength of emitted laser light is not particularly restricted. Wavelengths of 375 nm to 1.7 μm are usable, and particularly wavelengths of 650 to 900 nm are preferably used.

The laser diode 32 can have, for example, but is not limited to, a configuration in which an n electrode 32a configuring the second electrode, an n-GaAs substrate 32b, an n-InGaAlP clad layer 32c, a first InGaAlP guide layer 32d, an active layer 32e consisting of a multiquantum well (InGaP/InGaAlP) and the like, a second InGaAlP guide layer 32f, a p-InGaAlP clad layer 32g, a p electrode seed layer 32h, and a p electrode 32j configuring the first electrode are layered in sequence. Reflecting layers 32k and 32l for exciting oscillation by total reflection are formed on the front and back of the cleaved surfaces of the laser diode 32. The surface of the reflecting layer 32k, namely the surface of the laser diode 32 that faces the magnetic head slider 2, configures a light-emitting surface 32n of the laser diode 32. An emission center 32m is present at the position of the active layer 32e of the reflecting layer 32k. The n electrode 32a and the p electrode 32j can be made of an Au or Au alloy of approximately 0.1 μm in thickness. While the hard disc device is in operation, the laser diode 32 is powered by a power source within the hard disc device via the first electrode 32j and the second electrode 32a.

Figure 7A:
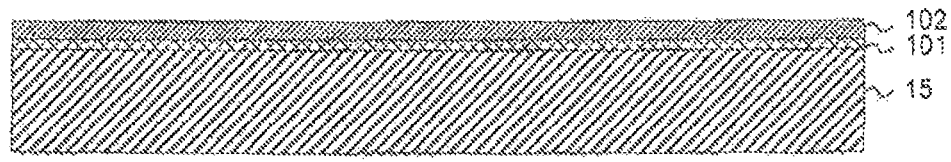
FIGS. 7A to 7J are schematic illustrations showing the production process of the plasmon generator.
Figure 7B:
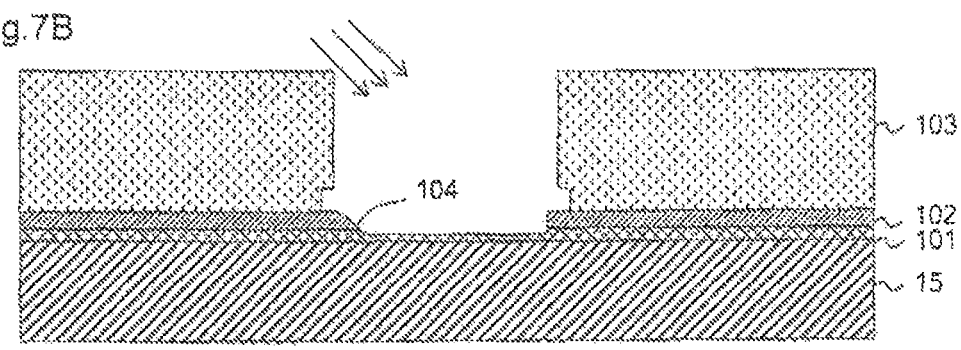
Figure 7C:
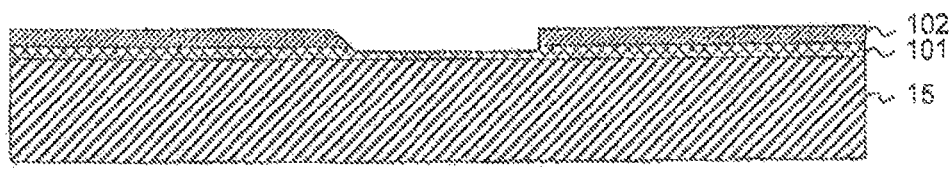
Figure 7D:
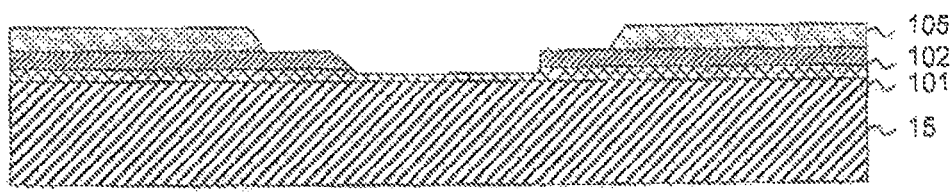
Figure 7E:
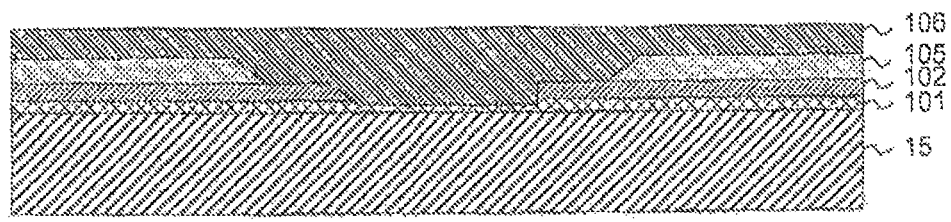
Figure 7F:
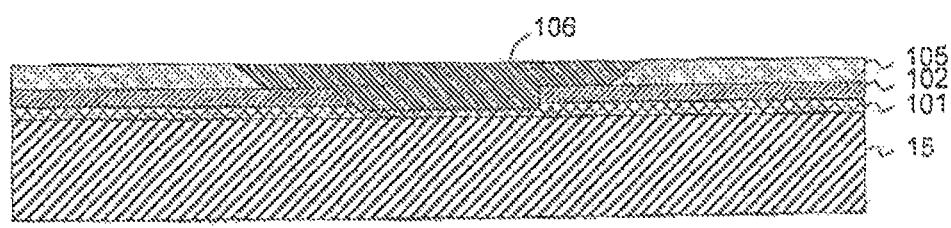
Figure 7G:
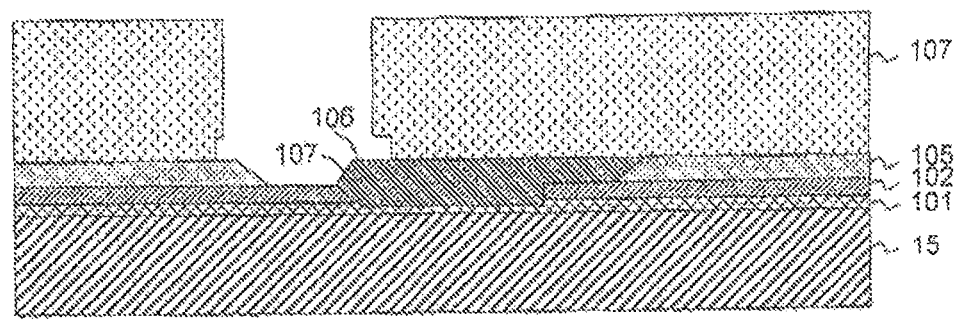
Figure 7H:
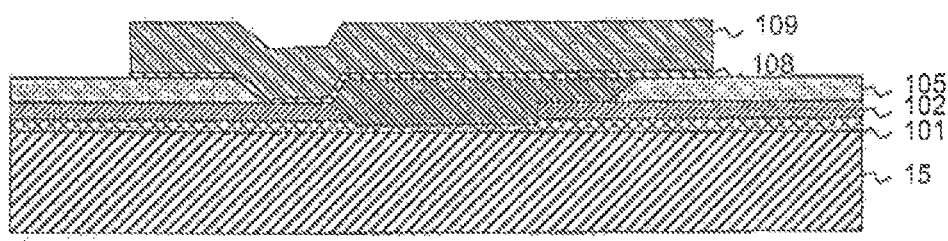
Figure 7I:
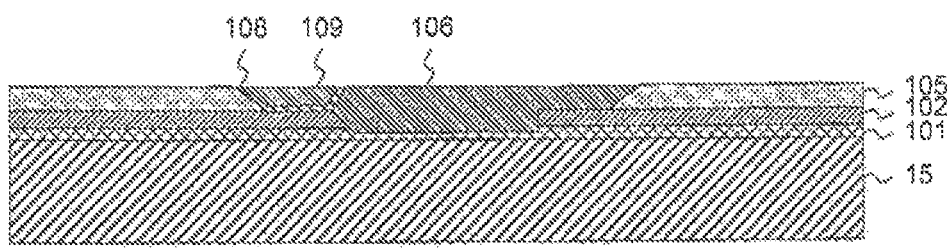
Figure 7J:
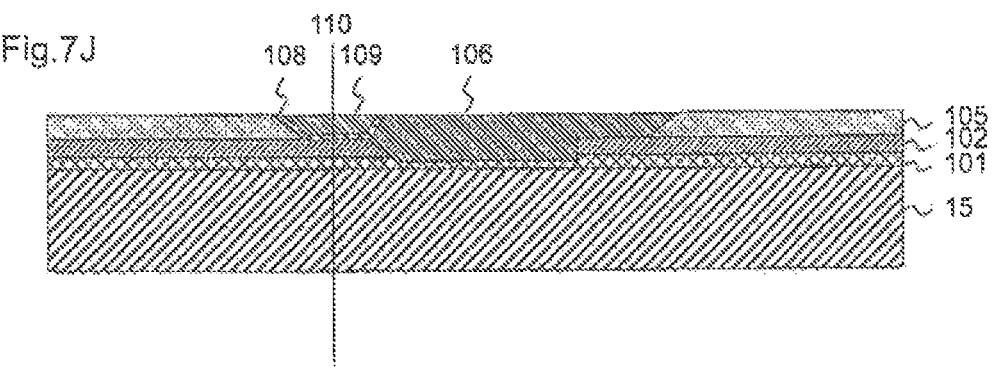

A method of producing the plasmon generator 16 will be described with reference to FIGS. 7A to 7J. First, as shown in FIG. 7A, an Al₂O₃ layer 101 and a SiO₂ layer 102 are formed on the core 15 as the seed layers of the plasmon generator 16. Then, as shown in FIG. 7B, a resist 103 is formed and the seed layers 101 and 102 are removed in part by ion milling. In doing so, an ion beam is emitted obliquely to form a slope 104 on the seed layers 101 and 102. Then, the resist 104 is removed as shown in FIG. 7C, and a dummy layer 105 is formed on the seed layers 102 and 103 as shown in FIG. 7D. Subsequently, an Au layer 106 serving as the second portion 16e of the plasmon generator 16 is formed as shown in FIG. 7E. The Au layer 106 is flattened as shown in FIG. 7F, and then a resist 107 is formed and the Au layer 106 in a region where the barrier layer 16f is to be formed is removed as shown in FIG. 7G. Since the milling rate is lower in the seed layer 102 than in the Au layer 106, mostly only the Au layer 106 is removed and a slope 107 is formed at the end portion of the Au layer 106. Then, as shown in FIG. 7H, an Ir layer 108 serving as the barrier layer 16f and an Au layer 109 serving as the first portion 16d of the plasmon generator 16 are formed. Then, the Ir layer 108 and the Au layer 109 are flattened as shown in FIG. 7I. Thus, the production steps of the plasmon generator 16 in the wafer process end. After the wafer process ends, the wafer is cut along a given line 110 and the cut surface is polished to obtain the plasmon generator 16 in which the distal end surface 16a is situated on the air bearing surface S and the first portion 16d and the second portion 16e are separated by the barrier layer.

A head gimbal assembly on which the thermal assisted magnetic recording head is mounted will be described hereafter.

Figure 8:
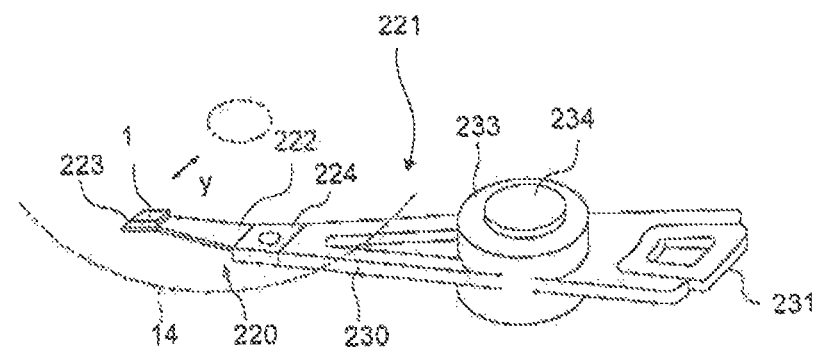
FIG. 8 is a perspective view of the head arm assembly of the present invention.

With reference to FIG. 8, a head gimbal assembly 220 includes the thermal assisted magnetic recording head 1 and a suspension 221 elastically supporting the thermal assisted magnetic recording head 1. The suspension 221 has a plate spring load beam 222 made of stainless steel, a flexure 223 provided at one end of the load beam 222, and a base plate 224 provided at the other end of the load beam 222. The thermal assisted magnetic recording head 1 is joined to the flexure 223 and given a proper degree of freedom. The portion of the flexure 223 where the thermal assisted magnetic recording head 1 is attached is provided with a gimbal part for maintaining a constant orientation of the thermal assisted magnetic recording head 1.

The head gimbal assembly 220 attached to an arm 230 is called a head arm assembly 221. The arm 230 moves the thermal assisted magnetic recording head 1 in the cross track direction y of the recording medium 14. One end of the arm 230 is attached to the base plate 224. A coil 231 serving as a part of a voice coil motor is attached to the other end of the arm 230. A bearing part 233 is provided in a middle part of the arm 230. The arm 230 is rotatably supported by a shaft 234 attached to the bearing part 233. The arm 230 and the voice coil motor driving the arm 230 configure an actuator.

Figure 9:
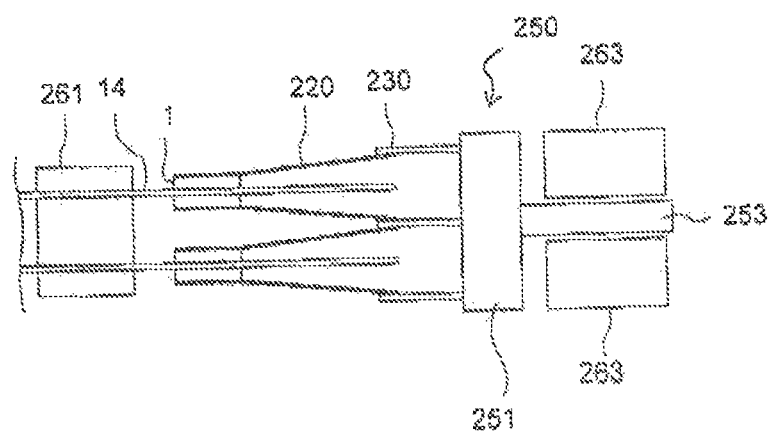
FIG. 9 is a side view of the head stack assembly of the present invention.
Figure 10:
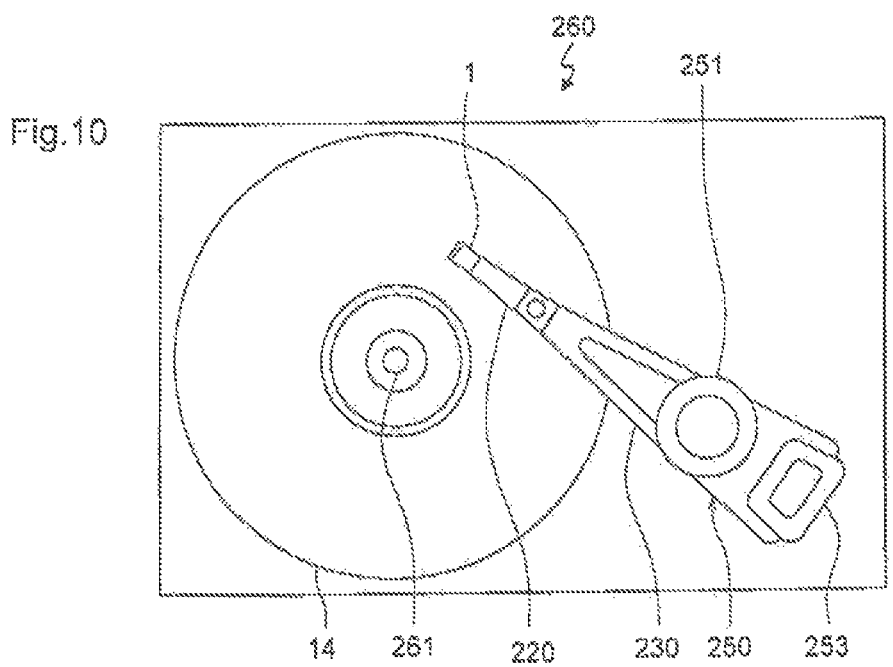
FIG. 10 is a plan view of the magnetic recording device of the present invention.

A head stack assembly and a magnetic recording device in which the above-described thermal assisted magnetic recording head 1 is installed will be described hereafter with reference to FIGS. 9 and 10. A head stack assembly consists of a carriage having multiple arms to each of which the head gimbal assembly 220 is attached. FIG. 9 is a side view of the head stack assembly and FIG. 10 is a plan view of the magnetic recording device. A head stack assembly 250 has a carriage 251 having multiple arms 230. The head gimbal assemblies 220 are attached to the arms 230 so as to be arranged in the vertical direction with a space in-between. A coil 253 serving as a part of the voice coil motor is attached to the carriage 251 on the opposite side to the arms 230. The voice coil motor has permanent magnets 263 facing each other via the coil 253.

With reference to FIG. 10, the head stack assembly 250 is installed in a magnetic recording device 260. The magnetic recording device 260 has multiple magnetic recording media 14 attached to a spindle motor 261. For each magnetic recording medium 14, two thermal assisted magnetic recording heads 1 are provided to face each other via the magnetic recording medium 14. The head stack assembly 250 excluding the thermal assisted magnetic recording heads 1, and the actuator, correspond to a positioning device, support the thermal assisted magnetic recording heads 1 and position the thermal assisted magnetic recording heads 1 with respect to the magnetic recording medium 14. The thermal assisted magnetic recording heads 1 are moved in the cross track direction of the magnetic recording medium 14 and are positioned with respect to the magnetic recording medium 14 by the actuator. The thermal assisted magnetic recording heads 1 record information on the magnetic recording medium 14 with the magnetic recording element 5 and reproduce information recorded on the magnetic recording medium 14 with the MR element 4.

A preferred embodiment of the present invention is presented and described in detail above. However, it is understood that various changes and modifications are available to the extent of not departing from the gist or scope of the attached claims.

The invention claimed is:

1. A magnetic recording device, comprising:
a plasmon generator generating surface plasmon and generating near-field light from the surface plasmon at a distal end surface situated on an air bearing surface facing a magnetic recording medium, having a first portion including the distal end surface, a second portion situated away from the air bearing surface, and a separating layer situated between the first portion and the second portion and extending across the plasmon generator to separate the plasmon generator into the first portion and the second portion, wherein
the first portion and the second portion of the plasmon generator are separated without physical contact,
the separating layer is exposed at the air bearing surface and extends from the air bearing surface along both a first plane and a second plane connected to the first plane, the first plane extends from the air bearing surface along a direction perpendicular to the air bearing surface, and the second plane extends along a direction oblique to the first plane and the air bearing surface, and
the formula:

$$V \times (1-\rho/\rho 0) < S \times 3 \text{ [nm]}$$

is satisfied in which V is a volume of the first portion, $\rho$ is a density of material configuring the first portion, $\rho 0$ is the density of the material configuring the first portion when no atomic vacancies are present, and S is an area of the distal end surface, and
the density of material configuring the first portion, $\rho$, does not equal the density of the material configuring the first portion when no atomic vacancies are present, $\rho 0$.

2. The magnetic recording device according to claim 1, wherein
the separating layer is made of a metal material that does not form a solid solution with a material configuring the first portion and the second portion.

3. The magnetic recording device according to claim 1, wherein
the separating layer is made of iridium, cobalt, or rhodium.

4. The magnetic recording device according to claim 1, wherein
a thickness of the separating layer is not smaller than 2 nm and not larger than 15 nm.

5. The magnetic recording device according to claim 1, wherein
the first portion has a surface extending from the air bearing surface in parallel to a height direction on a leading side.

6. A thermal assisted magnetic recording head, comprising:
a plasmon generator generating surface plasmon and generating near-field light from the surface plasmon at a distal end surface situated on an air bearing surface facing a magnetic recording medium, and a main pole situated near the plasmon generator on the air bearing surface and releasing a magnetic flux to the magnetic recording medium, wherein
the plasmon generator has a first portion including the distal end surface, a second portion situated away from the air bearing surface, and a separating layer situated between the first and second portions and extending across the plasmon generator to separate the plasmon generator into the first portion and the second portion, and
the first portion and the second portion of the plasmon generator are separated without physical contact, wherein
the separating layer is exposed at the air bearing surface and extends from the air bearing surface along both a first plane and a second plane connected to the first plane, the first plane extends from the air bearing surface along a direction perpendicular to the air bearing surface, and the second plane extends along a direction oblique to the first plane and the air bearing surface, and
the formula:

$$V \times (1-\rho/\rho 0) < S \times 3 \text{ [nm]}$$

is satisfied in which V is a volume of the first portion, $\rho$ is a density of material configuring the first portion, $\rho 0$ is a density of the material configuring the first portion when no atomic vacancies are present, and S is an area of the distal end surface, and
the density of material configuring the first portion, $\rho$, does not equal the density of the material configuring the first portion when no atomic vacancies are present, $\rho 0$.

7. The thermal assisted magnetic recording head according to claim 6, wherein
the separating layer is made of a metal material that does not form a solid solution with a material configuring the first and second portions.

8. The thermal assisted magnetic recording head according to claim 6, wherein
the separating layer is made of iridium, cobalt, or rhodium.

9. The thermal assisted magnetic recording head according to claim 6, wherein
a thickness of the separating layer is not smaller than 2 nm and not larger than 15 nm.

10. The thermal assisted magnetic recording head according to claim 6, wherein
the first portion has a surface extending from the air bearing surface in parallel to a height direction on a leading side.

11. A head gimbal assembly, comprising the thermal assisted magnetic recording head according to claim 8 and a suspension elastically supporting the thermal assisted magnetic recording head, wherein the suspension has a flexure to which the thermal assisted magnetic recording head is joined, a load beam of which one end is connected to the flexure, and a base plate connected to the other end of the load beam.

12. A magnetic recording device, comprising the thermal assisted magnetic recording head according to claim 6, a magnetic recording medium situated to face the thermal assisted magnetic recording head, a spindle motor rotating/driving the magnetic recording medium, and a device supporting the thermal assisted magnetic recording head and positioning the same with respect to the magnetic recording medium.

13. The magnetic recording device according to claim 1, wherein
the plasmon generator has a distal end portion having the air bearing surface, a main portion having a larger dimension in a down track direction than the distal end portion, and a transition portion situated between the distal end portion and the main portion, and
the separating layer is provided in the distal end portion and the transition portion.

14. The thermal assisted magnetic recording head according to claim 6, wherein
the plasmon generator has a distal end portion having the air bearing surface, a main portion having a larger dimension in a down track direction than the distal end portion, and a transition portion situated between the distal end portion and the main portion, and
the separating layer is provided in the distal end portion and the transition portion.

15. The magnetic recording device according to claim 1, wherein all atomic vacancies in the plasmon generator migrate toward the air bearing surface.

16. A magnetic recording device, comprising:
a plasmon generator generating surface plasmon and generating near-field light from the surface plasmon at a distal end surface situated on an air bearing surface facing a magnetic recording medium, having a first portion including the distal end surface, a second portion situated away from the air bearing surface, and a separating layer situated between the first portion and the second portion and extending across the plasmon generator to separate the plasmon generator into the first portion and the second portion, wherein
the first portion and the second portion of the plasmon generator are separated without physical contact, and
the formula:

$$V \times (1-\rho/\rho 0) \leq S \times 3 \, [nm]$$

is satisfied in which V is a volume of the first portion, $\rho$ is a density of material configuring the first portion, $\rho 0$ is the density of the material configuring the first portion when no atomic vacancies are present, and S is an area of the distal end surface, wherein
the density of material configuring the first portion, $\rho$, does not equal the density of the material configuring the first portion when no atomic vacancies are present, $\rho 0$.

17. A thermal assisted magnetic recording head, comprising:
a plasmon generator generating surface plasmon and generating near-field light from the surface plasmon at a distal end surface situated on an air bearing surface facing a magnetic recording medium, and a main pole situated near the plasmon generator on the air bearing surface and releasing a magnetic flux to the magnetic recording medium, wherein
the plasmon generator has a first portion including the distal end surface, a second portion situated away from the air bearing surface, and a separating layer situated between the first and second portions and extending across the plasmon generator to separate the plasmon generator into the first portion and the second portion, and
the first portion and the second portion of the plasmon generator are separated without physical contact, and
the formula:

$$V \times (1-\rho/\rho 0) \leq S \times 3 \, [nm]$$

is satisfied in which V is a volume of the first portion, $\rho$ is a density of material configuring the first portion, $\rho 0$ is the density of the material configuring the first portion when no atomic vacancies are present, and S is an area of the distal end surface, wherein
the density of material configuring the first portion, $\rho$, does not equal the density of the material configuring the first portion when no atomic vacancies are present, $\rho 0$.

* * * * *